United States Patent
Diab et al.

(10) Patent No.: US 8,301,913 B2
(45) Date of Patent: Oct. 30, 2012

(54) SYSTEM AND METHOD FOR DYNAMIC POWER PROVISIONING FOR A WIRELESS ACCESS POINT

(75) Inventors: Wael William Diab, San Francisco, CA (US); Martin McNarney, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 383 days.

(21) Appl. No.: 12/415,767

(22) Filed: Mar. 31, 2009

(65) Prior Publication Data

US 2010/0211806 A1 Aug. 19, 2010

Related U.S. Application Data

(60) Provisional application No. 61/152,910, filed on Feb. 16, 2009.

(51) Int. Cl.
*G06F 1/32* (2006.01)
*G06F 1/26* (2006.01)
*G06F 15/177* (2006.01)

(52) U.S. Cl. ........ 713/300; 713/310; 713/320; 713/323; 713/324; 713/340; 370/338

(58) Field of Classification Search .................. 370/913, 370/200, 311, 338; 455/436, 437, 439; 713/300, 713/310, 320–324, 330, 340
See application file for complete search history.

(56) References Cited

U.S. PATENT DOCUMENTS

| | | | |
|---|---|---|---|
| 8,078,889 B2 * | 12/2011 | Jonnala et al. | 713/310 |
| 2007/0041387 A1 * | 2/2007 | Ghoshal et al. | 370/395.52 |
| 2008/0062942 A1 * | 3/2008 | Hills et al. | 370/338 |
| 2008/0181184 A1 * | 7/2008 | Kezys | 370/338 |
| 2009/0191876 A1 * | 7/2009 | Jain et al. | 455/437 |
| 2010/0002610 A1 * | 1/2010 | Bowser et al. | 370/311 |
| 2010/0031066 A1 * | 2/2010 | Geiger et al. | 713/300 |
| 2010/0100750 A1 * | 4/2010 | Bobrek | 713/300 |
| 2010/0195549 A1 * | 8/2010 | Aragon et al. | 370/311 |

* cited by examiner

*Primary Examiner* — Fahmida Rahman
(74) *Attorney, Agent, or Firm* — Duane S. Kobayashi

(57) ABSTRACT

A system and method for dynamic power provisioning for a wireless access point. Various types of power management information (e.g., number of users, connection speed, etc.) can be used in a process for determining a power request/priority for a wireless access point (WAP). The determined power request/priority can then be used in a dynamic allocation process by which the WAP's allocated power budget can seek to match its current power needs.

18 Claims, 4 Drawing Sheets

SYSTEM AND METHOD FOR DYNAMIC POWER PROVISIONING FOR A WIRELESS ACCESS POINT

This application claims priority to provisional application no. 61/152,910, filed Feb. 16, 2009, which is incorporated by reference herein, in its entirety, for all purposes.

BACKGROUND

1. Field of the Invention

The present invention relates generally to IEEE 802.3 and Power over Ethernet (PoE) and, more particularly, to a system and method for dynamic power provisioning for a wireless access point.

2. Introduction

Power over Ethernet (PoE) (also known as inline power and phantom power) specifications such as IEEE 802.3af (PoE) and 802.3at (PoE Plus) provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

Conventionally, the PoE and PoE Plus specifications are designed to work on two-pair cabling using a pair of transformers in the PSE and the PD. PoE is capable of running over a worst case of 100 m on two pairs of Cat 3 cabling and PoE Plus is capable of running on a worst case of 100 m on two pairs of Cat 5 cabling. Implementations of PoE and PoE Plus include multiple instantiations for example over all four pairs. Non-standard four-pair as well as two-pair implementations also exist.

One of the challenges in providing PoE support is the proper allocation of power amongst a plurality of PDs. This is due, in part, to the limited power supply that is available to the PSEs. What is needed therefore is a mechanism that enables a dynamic allocation of power to PDs coupled to the PSEs. This is especially true of those PDs that have highly variable power usage profiles.

SUMMARY

A system and/or method for dynamic power provisioning for a wireless access point, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
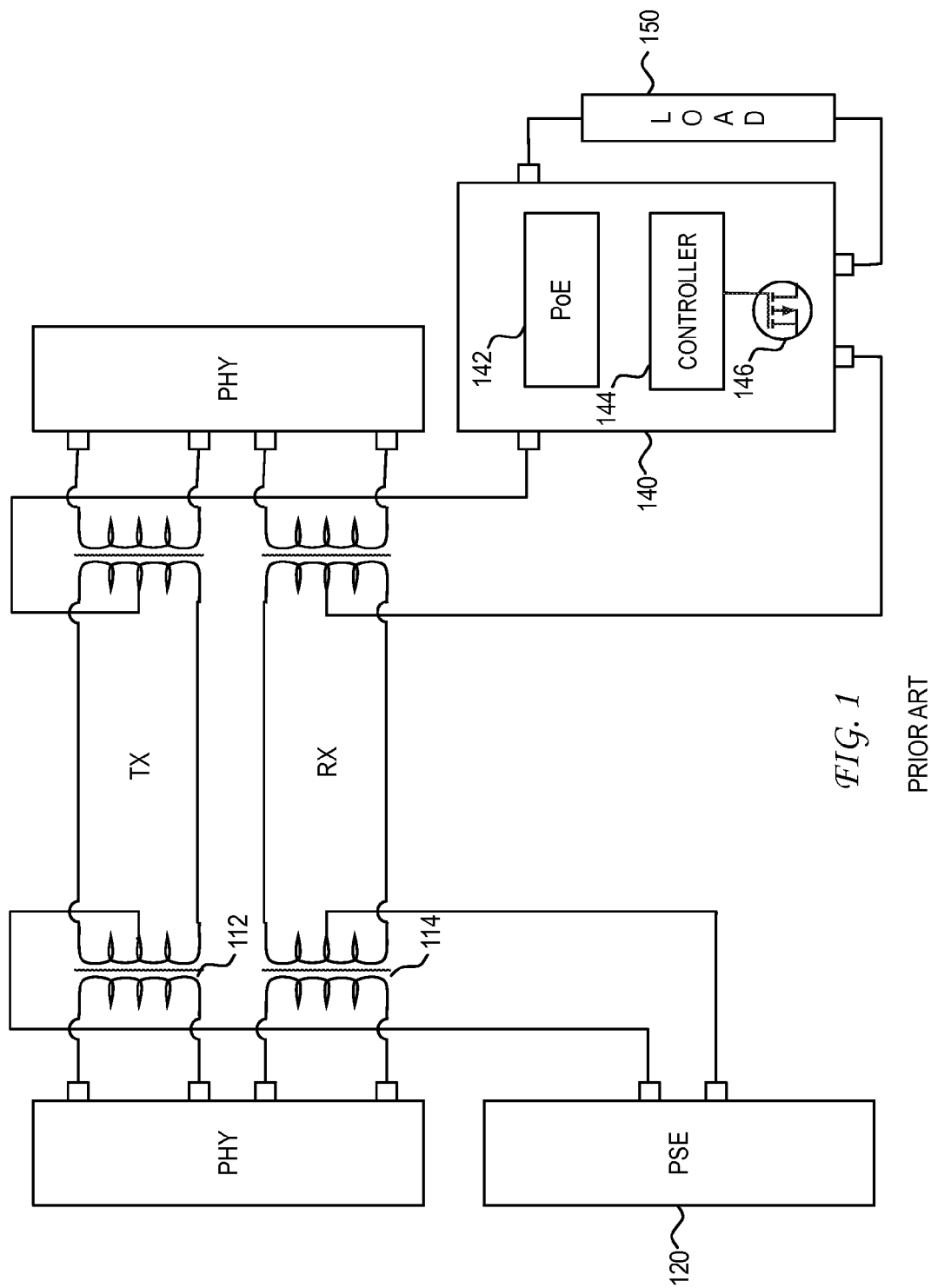
FIG. 1 illustrates an embodiment of a PoE system.

FIG. 1 illustrates an example of a conventional PoE system. As illustrated, the PoE system includes PSE 120 that transmits power to powered device (PD) 140 over two wire pairs. Power delivered by PSE 120 to PD 140 is provided through the application of a voltage across the center taps of a first transformer 112 that is coupled to a transmit (TX) wire pair and a second transformer 114 that is coupled to a receive (RX) wire pair carried within an Ethernet cable.

As is further illustrated in FIG. 1, PD 140 includes PoE module 142. PoE module 142 includes the electronics that would enable PD 140 to communicate with PSE 120 in accordance with a PoE specification such as IEEE 802.3af (PoE), 802.3at (PoE Plus), legacy PoE transmission, or any other type of PoE transmission. PD 140 also includes controller 144 (e.g., pulse width modulation DC:DC controller) that controls power transistor (e.g., FET or bipolar) 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over two pairs or 60 W of power to a PD over four pairs. Other proprietary solutions can potentially deliver even higher levels of power to a PD. In general, high power solutions are often limited by the limitations of the cabling.

In the PoE process, a valid device detection is first performed. This detection process identifies whether or not the PSE is connected to a valid device to ensure that the PSE does not provide power to non-PoE capable devices. After a valid PD is discovered, the PSE can perform a power classification. In one example of a conventional 802.3af power allocation, each PD would initially be assigned a 15.4 W power classification after a Layer 1 discovery process. Next, a Layer 2 classification engine can be used to reclassify the PD. Such a Layer 2 classification process can be included in PoE systems such as 802.3af, 802.3at or proprietary schemes.

As noted, one of the responsibilities of the PSE is to manage the power that is supplied to the various connected PDs. This management is necessary because the PSE is typically constrained by the total power budget that is provided by one or more connected power supplies. A typical usage scenario occurs when the limited PSE power supply is oversubscribed. In this oversubscribed operating state, the PSE only has enough power to support a subset of the connected PDs, each of which is attempting to extract as much power as possible from the PSE. The allocation of power to the various competing PDs therefore represents a significant challenge as the PSE implements a power sourcing policy that is based on measures of fairness, priority, etc. Such a challenge is best met by identifying differences in the needs and priorities of the various PDs.

As noted, one example of a PD is a wireless LAN access point (WAP). WAP support of PoE can greatly ease the installation of such devices. As would be appreciated, WAPs can be widely distributed to enable maximal coverage of a given area such as an enterprise footprint. The installation of WAPs in these distributed areas is greatly simplified through PoE's elimination of a WAP's need for an AC power plug. WAP support of PoE powering enables both power and data to be delivered via a single Ethernet cable. This Ethernet cable can be easily routed through ceilings and various other conduits without the same constraints of power circuits. Increased installation flexibility is therefore provided in the provisioning of WAPs in remote areas.

Conventional WAPs can be designed to support various radio types such as 802.11 a/b/g/n. Conventional WAPs can also be designed to support up to a maximum number of wireless users (e.g., 64, 128,etc.). With conventional PoE powering, the WAP would require a power allocation that was sufficient to support the worst-case usage profile of a maximum number of wireless users at an assumed mix of radio types. This power allocation to a single WAP would severely limit the capacity of the PSE to effectively support other PDs in the network.

In the present invention, it is recognized that the power allocated to the WAP during the classification process necessarily leads to a power allocation that is often unnecessarily large. This results since the conventional WAP is configured at the outset to request an amount of power that would enable it to provide full support for the maximum number of wireless devices. As the power consumed by the WAP can vary significantly in relation to the number of wireless devices and radio types, this initial power allocation would be wasteful in consideration of the real-world variability in the number and types of connected wireless devices at any given point in time. Here, it should be noted that WAPs are designed to provide short-term support for devices, the set of devices being supported at any given time being inherently variable in nature.

Since effective management of this variability in consumed power has thus far not been available, dynamic PSE power management of WAP devices has suffered. This is due in part to the fact that WAPs are part of the computing infrastructure. To minimize risks to the computing infrastructure, IT administrators are often willing to accept waste in power allocations to PSEs. In this line of thinking, waste in power allocated to a WAP is acceptable since the WAP performs a mission critical infrastructure function for the enterprise. Risks of a power-starved condition are therefore eliminated through waste.

Figure 2:
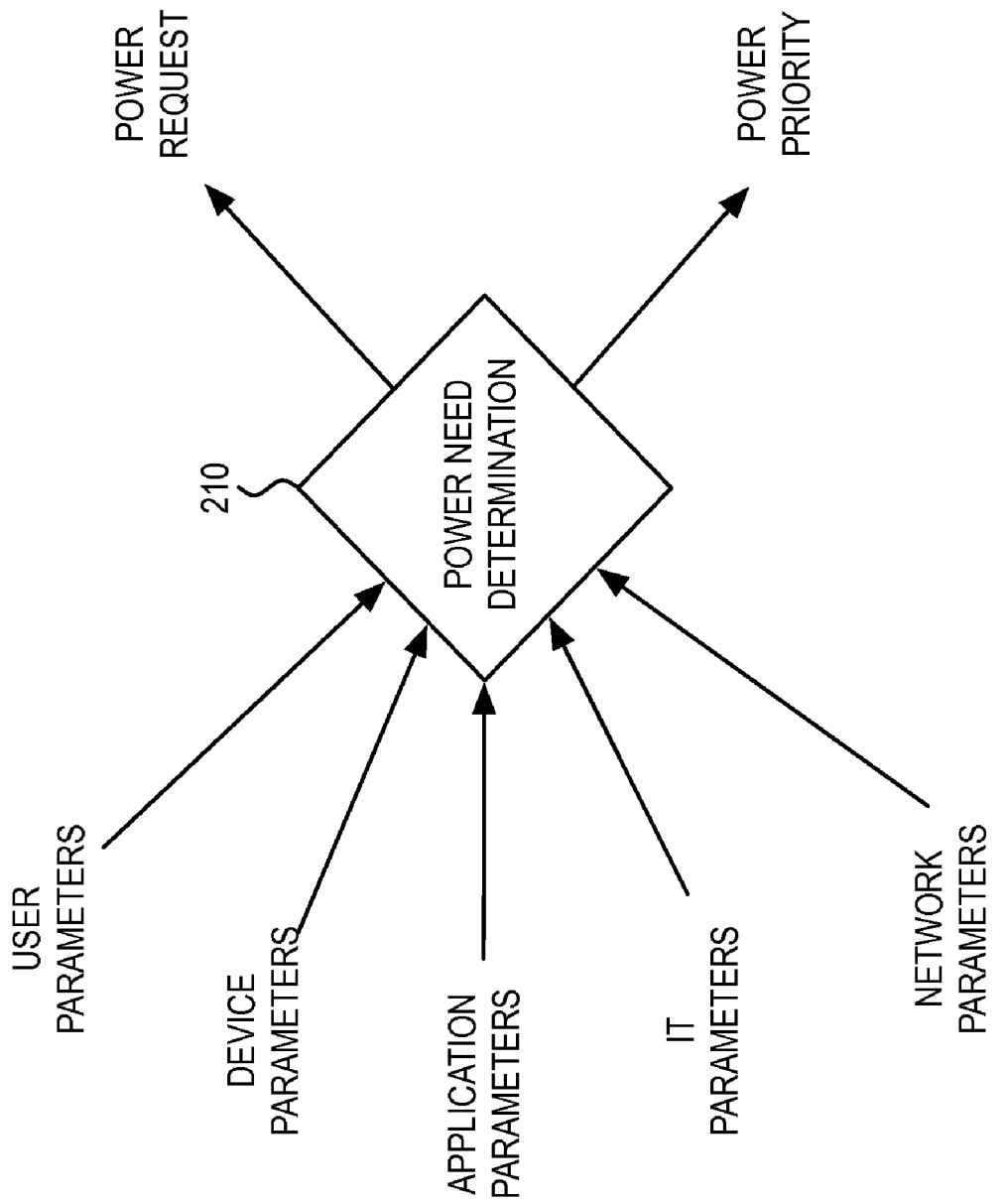
FIG. 2 illustrates an example of a power need determination.

In the present invention, a power need determination is used in combination with a dynamic Layer 2 power allocation scheme to provide effective power management of the WAP by the PSE. An example of such a power need determination used to generate a power request and priority for the WAP is illustrated in FIG. 2.

As illustrated, various power management information can be used as inputs to power need determination 210. In this illustration, the power management information includes general classes of information such as user parameters, device parameters, application parameters, IT parameters, and network parameters. With this input set of power management information, power need determination 210 can then produce a power request and power priority for the WAP.

An example of a user parameter is the number of connected radios. Another example of a user parameter is a usage profile or restriction of a particular mobile device or user. This usage profile or restriction may include, for example, a measure of the amount of bandwidth that the particular mobile device has used or is restricted to. As would be appreciated, the user parameter can represent a current measure, average measure over a given time period (e.g., 10 minutes), or an expected measure based on past empirical data (e.g., usage patterns or restrictions).

An example of device parameters is the type of radio. For example, a typical WAP can support a mix of radio types, such as 802.11a/b/g/n. Here, 802.11b can support a max data rate of 11 Mbit/s, 802.11a and 802.11g can support a max data rate of 54 Mbit/s, and 802.11n can support a max data rate of 300 Mbit/s using two streams. As would be appreciated, the amount of transmit power by the WAP would increase for higher data rates to satisfy a minimal receive sensitivity level at a given distance from the mobile device. As the range and capabilities of each mobile device will vary, so also will the amount of transmit power used by the WAP in supporting that mobile device.

An example of application parameters is the mode of operation of the WAP. For example, the WAP can be used as a conventional access point, as a wireless bridge between two or more wired LANs, as a repeater that extends wireless coverage, etc. Each of these different modes can affect the amount of power expected to be consumed by the WAP.

IT parameters can include parameters such as the WAP model, IT policies, performance characteristic data, etc. For example, the WAP model may help identify differences in power usage profiles for a WAP model from a first manufacturer as compared to a WAP model from a second manufacturer. IT policies, on the other hand, can represent any policy that can impact WAP usage. For example, IT personnel can enforce a policy that limits the number of mobile devices that the WAP can support. A WAP serving a public area, for example, may be limited to ten users.

Finally, network parameters can include the length of the cable, type of cable, temperature of the cable, etc. that is supporting a WAP. This information can influence powering of the WAP because the resistance of the cable dictates the amount of power that is consumed by the cable. This is a significant factor when considering WAP deployments that are inherently intended to cover a vast area. Powering WAPs over long Ethernet cable spans can therefore produce significant power loss in the cable itself.

As noted, the input set of power management information is used by power need determination 210 to produce a power request and power priority for the WAP. This power request and power priority is used to guide the PSEs dynamic allocation of power to the WAP, thereby ensuring that the power budget allocated to the WAP is not unnecessarily high.

To illustrate this power need determination process, consider an example power need determination that is based on an analysis of user parameters, device parameters, and IT parameters. In a simple example, the user parameters can include the number of mobile devices supported, while the device parameters can include the mix of radio types.

In a first operating condition, the WAP may be supporting five mobile devices, wherein four devices are connected using 802.11b and one mobile device is connected using 802.11g. In this first operating condition, the power need determination would determine that the WAP is operating at a relatively low usage capacity. The resulting power request may therefore indicate that the WAP needs five watts of power from the PSE. This power request could also come at a first power priority level that is based on IT parameters that indicate the particular importance of that WAP as part of the network infrastructure.

At a second operating condition at a later point in time, the WAP may be supporting 45 mobile devices, wherein 13 of those mobile devices are connected using 802.11b and 32 of those mobile devices are connected using 802.11g. In this second operating condition, the higher number of supported mobile devices along with a higher percentage of 802.11g radio types would determine that the WAP is operating at a relatively high usage capacity. The resulting power request may therefore indicate that the WAP needs 11 watts of power. This power request could also come at a second power priority level, wherein the second power priority level is the first power priority level augmented by a scaling factor that reflects the increased importance of the WAP in the infrastructure due to the higher number of users supported by the WAP.

As the above example illustrates, the user parameters, device parameters and IT parameters can be used to identify a relative power request and priority of the WAP at different points in time. As would be appreciated, other classes of parameters can be used in combination with the user parameters, device parameters and IT parameters to drive a more detailed power need determination that produces an appropriate power request and priority level of the WAP. In general, the particular combination of parameters used in the power need determination of the WAP would be implementation dependent.

In one embodiment, one or more of the various types of power management information would be communicated by the WAP to the PSE for power need determination. In one embodiment, this communication can be effected via Layer 2 packets (e.g., LLDP). In an alternative embodiment, the power need determination can be performed in the WAP itself, wherein power management information is sent to the WAP. As would be appreciated, one or more of the various types of power management information (e.g., IT, network parameters, etc.) can also be stored in a profile database that is accessible by a PoE system via a network (e.g., Intranet).

Figure 3:
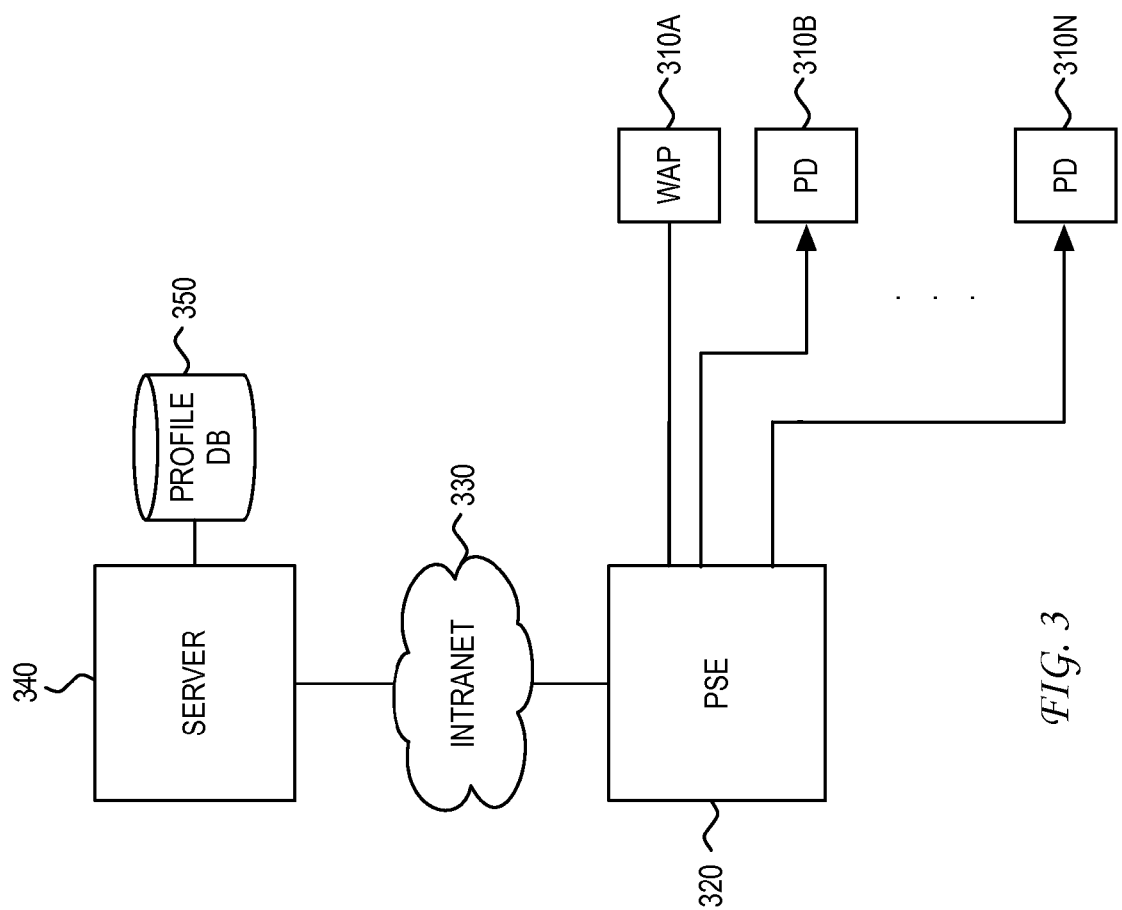
FIG. 3 illustrates an example of a network configuration.

FIG. 3 illustrates an example of such a network configuration. As illustrated, PSE 320, which can be part of a switch, supports a plurality of PDs 310A-310N, wherein PD 310A is a WAP. In performing a power need determination for WAP 310A, PSE 320 would access profile database 350 via server 340. Server 340 is linked to PSE 320 via intranet 330. In performing a power need determination for WAP 310A, parameters can then be retrieved from one or more of profile database 350, PSE 320 and WAP 310A. In one embodiment, the power need determination is performed by a host system or other network/IT management terminal that is separate from PSE 320. In this embodiment, PSE 320 would be designed to receive results or other information regarding the power need determination to therefore implement the needed adjustments in the allocation of power amongst the plurality of PDs 310A-310N.

Through the input of various WAP-related parameters into the power need determination process, an appropriate power request and power priority can be generated for the WAP at an operating point subsequent to the initial power classification. This dynamic power need determination process enables the power allocated to the WAP to closely track the WAP's actual power needs, which can vary considerably due to the drastic changes in the number and corresponding mix of radio types in the supported devices. This tracking enables the PSE to reduce the power budget allocated to the WAP, thereby freeing additional power for other PDs that are connected to the PSE.

Figure 4:
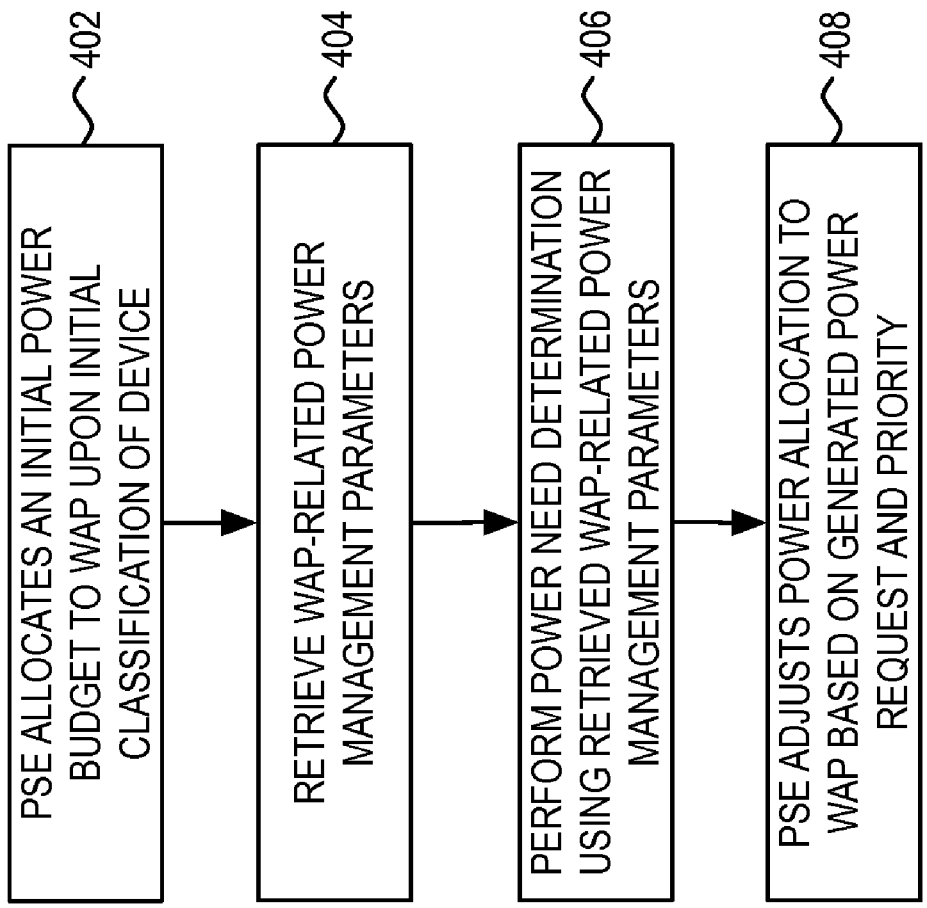
FIG. 4 illustrates a flowchart of a process of the invention.

To further illustrate the features of the present invention, reference is now made to the flowchart of FIG. 4. As illustrated, the process begins at step 402 where the PSE allocates an initial power budget to a WAP upon an initial classification of the device. As would be appreciated, various mechanism can be used to generate an initial classification. For example, the initial classification can be based on Layer 1 communication. In general, the initial classification refers to the classification that occurs prior to active usage of the WAP in servicing mobile devices.

After the initial classification is completed, the WAP receives an allocated amount of power from the PSE to accommodate active operation of the WAP. Once initialized and active on the network, the WAP can then begin to support mobile devices needing a network connection. At step 404, WAP-related power management parameters are retrieved that are reflective of active use of the WAP. As noted above, these WAP-related power management parameters can include the number of supported mobile devices as well as the mix of radio types in the set of supported mobile devices. The full set of WAP-related power management parameters needed by the particular instance of the power need determination are then retrieved from one or more devices in the network (e.g., WAP, PSE, network database, etc.).

At step 406, the retrieved set of WAP-related power management parameters are used by the power need determination to generate a power request and power priority. This generated power request and power priority can represent the determined power needs of the WAP for the next increment of time. In one embodiment, the increment of time can represent a fixed amount of time between the next power analysis and update. In another embodiment, the increment of time can represent a variable amount of time that can end upon the initiative of the WAP, the PSE, or other power or network management device. This scenario represents the situation where the power allocation of the PSE (either to the WAP alone or to the full set of PDs) is deemed to be inadequate or otherwise in need of an update.

Regardless of the amount of time for which the power request and power priority are to remain valid, the PSE would adjust, at step 408 the power allocation to the WAP based on the generated power request and priority. Significantly, this adjustment to the power allocation occurs after the initial power classification of the WAP. Further, the adjustment of the power allocation is performed in consideration of the actual usage of the WAP, which will vary widely based on the number of supported devices and the mix of radio types.

While the above example focuses on the response of the PSE to the changes in WAP-related power management parameters, the WAP can also be configured to constrain its operation based on power allocated to it by the PSE. For example, the power allocated to the WAP can be statically or dynamically determined by the PSE based on its current load of supported PDs. Regardless of the particular type of determination, the WAP has been allocated a set amount of power for a fixed or variable amount of time. In one example, the current load of supported PDs may dictate that the PSE can afford a power budget that is only a portion of what has been requested by the WAP.

Due to the variability in supported devices, the WAP can be configured to self-impose limits on its operation in consideration of the allocated amount of power. For example, once the WAP has been allocated an amount of power (e.g., 8 watts), the WAP can determine a ceiling on the number of mobile devices it can support, as well as the mix of radio types for a given number of supported mobile devices. As would be appreciated, the ceiling on the number of mobile devices is based on the amount of available power, not on the actual maximum number of devices that the manufacturer has designed the WAP to support. This self-imposed restriction is designed to ensure that the WAP can respond to rapidly-changing network needs in a way that is consistent with its previous power allocation, while also not jeopardizing its role as part of the network infrastructure. Here, it should be noted that an oversubscription of power by the WAP could jeopardize the PSE's ability to effectively support a plurality of PDs. In one embodiment, an encroachment of the self-imposed restriction (e.g., refusal of a connection request from a mobile device) can be the basis for the generation of a new power need determination and resulting power request and priority.

In one embodiment, the power request generated for a WAP can be stated in the form of multiple alternative (or fallback) power requests. Here, the power requested can be for full power, or in the alternative, one or more fractional portions of that full amount of power. If the PSE cannot provide the full requested power, the PSE could then decide to allocate one of the lower, alternative power requests. As the WAP can be designed to operate with self-imposed restrictions, the WAP can be designed to configure its operation to fit within the power envelope that has been specified by the PSE. As noted, the WAP could proceed to limit the number of users that can be supported, limit the number of antennas used, limit the transmission rate for supported connections, etc.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   prior to active use of a wireless access point in supporting one or more mobile devices, establishing an initial power classification that identifies an initial power budget provided by a power sourcing equipment to said wireless access point via a network cable;
   operating said wireless access point using said initial power budget, said operating supporting a first plurality of mobile devices;
   during said operation of said wireless access point, determining, by said wireless access point, a request for a new power budget for said wireless access point, said determination being based on at least one parameter that reflects an operating load of said wireless access point in actively supporting said first plurality of mobile devices, said request also including one or more fallback power budgets that represent alternative lower power budgets relative to said new power budget, wherein said determination is based on a mode of operation of said wireless access point, said mode of operation being one of a wireless bridge mode and a repeater mode; and
   limiting, by said wireless access point, a number of additional mobile devices that can be supported by said wireless access point, wherein said limitation is determined based on allocation by said power sourcing equipment of one of said fallback power budgets.

2. The method of claim 1, wherein said determining is based on connection speeds of said first plurality of mobile devices.

3. The method of claim 1, further comprising initiating a new determination after said wireless access point denies a requested connection of one or more mobile devices.

4. The method to claim 1, wherein said determination is based on a number of mobile devices connected to said wireless access point.

5. The method of claim 4, wherein said determination is based on said number of mobile devices relative to a maximum number of mobile devices for said wireless access point.

6. The method of claim 1, wherein said determination is based on a usage profile of a user.

7. The method of claim 1, wherein said determination is based on a usage profile of a mobile device.

8. The method of claim 1, wherein said determination is based on a model type of said wireless access point.

9. The method of claim 1, wherein said determination is based on a characteristic of said network cable.

10. A wireless access point device, comprising:
    a network interface configured for coupling to a power sourcing equipment via a network cable, said network interface enabling the wireless access point device to receive power from said power sourcing equipment via said network cable; and
    a power module that is configured to communicate with said power sourcing equipment in coordinating a delivery of power to the wireless access point device, wherein after an initial power budget is established that enables the wireless access point device to support a first plurality of mobile devices, said power module determines a request for a new power budget for the wireless access point device, said determination being based on at least one parameter that reflects an operating load of the wireless access point device in actively supporting said first plurality of mobile devices, said request also including one or more fallback power budgets that represent alternative lower power budgets relative to said new power budget, wherein an allocation by said power sourcing equipment of one of said fallback power budgets produces a limitation in a number of additional mobile devices that can be supported by the wireless access point device, wherein said determination is based on a mode of operation of said wireless access point device, said mode of operation being one of a wireless bridge mode and a repeater mode.

11. The wireless access point device of claim 10, wherein said determination is based on connection speeds of said first plurality of mobile devices.

12. The wireless access point device of claim 10, wherein said determination is initiated after the wireless access point device denies a requested connection of one or more mobile devices.

13. The wireless access point device of claim 10, wherein said determination is based on a number of mobile devices connected to said wireless access point device.

14. The wireless access point device of claim 13, wherein said determination is based on said number of mobile devices relative to a maximum number of mobile devices for said wireless access point device.

15. The wireless access point device of claim 10, wherein said determination is based on a usage profile of a user.

16. The wireless access point device of claim 10, wherein said determination is based on a usage profile of a mobile device.

17. The wireless access point device of claim 10, wherein said determination is based on a model type of said wireless access point device.

18. The wireless access point device of claim 10, wherein said determination is based on a characteristic of said network cable.

* * * * *